Jan. 26, 1926.  1,570,895
E. HOPKINSON ET AL
PROCESS FOR MAKING ARTICLES OF VARIOUS SHAPES DIRECTLY FROM SOLUTIONS
OR SUSPENSIONS OF RUBBER, AND TO THE ARTICLES SO OBTAINED
Original Filed April 17, 1923
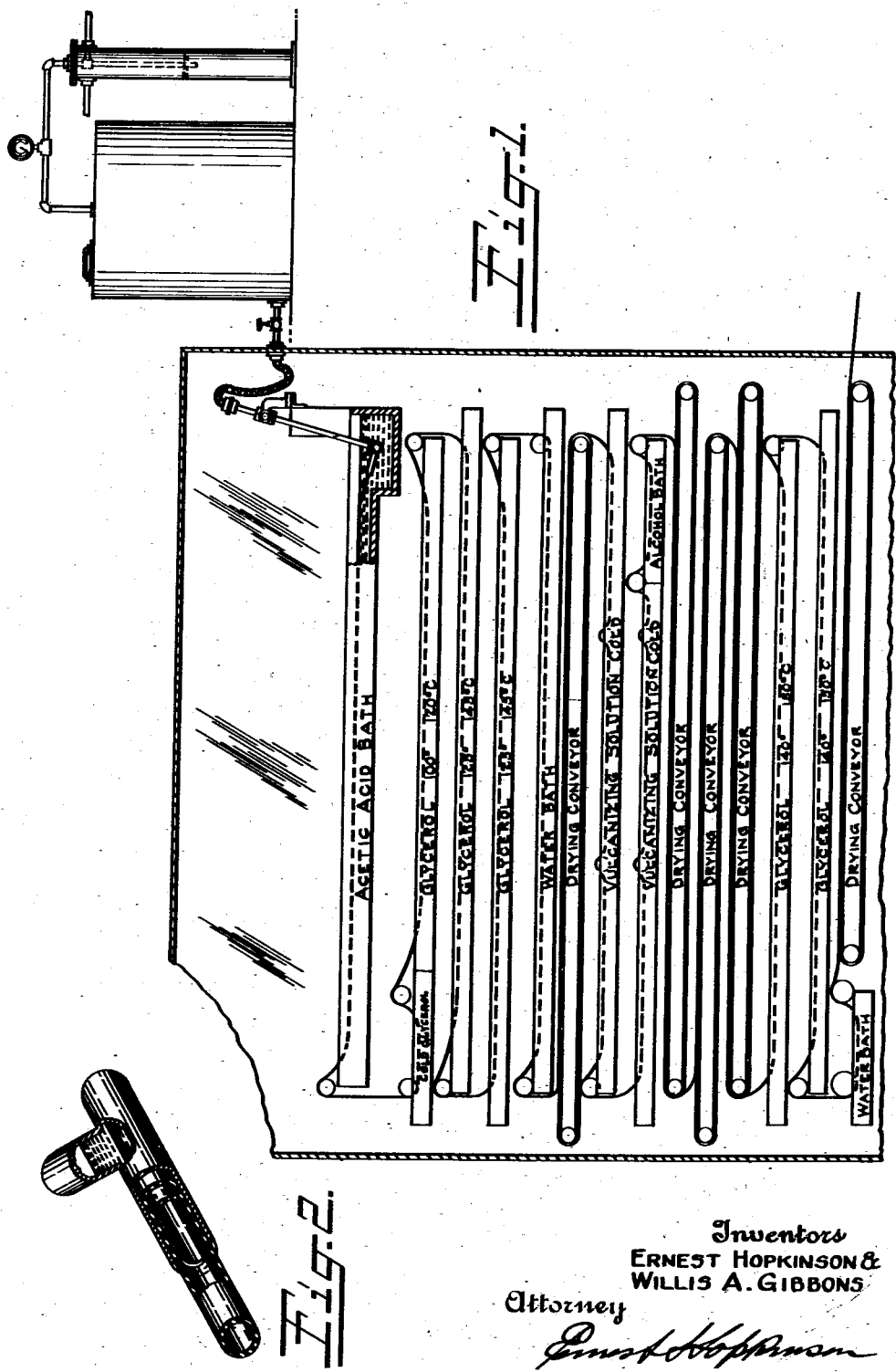
Inventors
ERNEST HOPKINSON &
WILLIS A. GIBBONS Patented Jan. 26, 1926.

1,570,895

UNITED STATES PATENT OFFICE.

ERNEST HOPKINSON, OF NEW YORK, AND WILLIS A. GIBBONS, OF LITTLE NECK, NEW YORK, ASSIGNORS TO REVERE RUBBER COMPANY, OF CHELSEA, MASSACHUSETTS, A CORPORATION OF RHODE ISLAND.

PROCESS FOR MAKING ARTICLES OF VARIOUS SHAPES DIRECTLY FROM SOLUTIONS OR SUSPENSIONS OF RUBBER, AND TO THE ARTICLES SO OBTAINED.

Original application filed April 17, 1923, Serial No. 632,609. Divided and this application filed June 10, 1925. Serial No. 36,082.

*To all whom it may concern:*

Be it known that we, ERNEST HOPKINSON and WILLIS A. GIBBONS, both citizens of the United States, and residents of New York, county and State of New York, and Little Neck, L. I., county of Nassau, State of New York, have invented certain new and useful Improvements in processes for making articles of various shapes directly from solutions or suspensions of rubber, and to the articles so obtained, of which the following is a full, clear, and exact description.

This invention relates to the manufacture of articles of various shapes, and particularly tubular articles and tubing of various shapes and dimensions by extruding solutions or suspensions of rubber and recovering the solid constituents thereof in the desired form.

This application is a division of our application Serial No. 632,609, filed April 17, 1923, now issued as U. S. Patent 1,545,257, dated July 7, 1925.

Tubular articles and tubing of various sorts have hitherto been manufactured by extruding compounded raw rubber into the desired shape and later vulcanizing in molds or in talc or in an atmosphere of steam under pressure, and usually the tubular articles of larger size, such as inner tubes, are wrapped in wet cloth prior to vulcanizing. Another method of making such articles is to wrap a flat sheet of compounded rubber around a mandrel or form, lapping the edges of the sheet to form a seam. Inner tubes and some of the larger sizes of hose are usually made by the extruding process, and vulcanized on a pole or mandrel. After vulcanizing inner tubes are made by trimming off to the desired length, skiving the ends and cementing together. In the manufacture of tubing by the extrusion process it is unavoidable that the rubber must be rather severely milled in order to mix the compounding ingredients therewith and to bring the batch to the proper plasticity for extrusion.

The present invention sets forth a method of manufacturing tubular articles and tubing directly from solutions and suspensions of rubber, and particularly from the natural suspension or dispersion known as rubber latex, and this forms the principal object of the invention. Other objects are to eliminate the disadvantages of the process heretofore employed and to provide simpler methods for making tubing. Another object is to manufacture tubular articles and tubing of high physical strength, which object is achieved by virtue of the absence of any deleterious milling or excessive working of the rubber stock during manufacture. Other objects will be apparent in the following description.

With a particular method in mind, but not desiring to limit the invention beyond what may be required by the prior art, the invention briefly stated consists in extruding a tubular stream of rubber solution or suspension into a coagulating bath, simultaneously forming within the tubular stream a core of a coagulating material, and recovering a tubular body of rubber continuous with the stream. The invention also includes the use of fresh or preserved natural latex which may or may not contain compounding ingredients and/or vulcanizing ingredients, and it also includes latex which has previously been vulcanized without coagulation.

In the appended drawing is shown schematically a suitable apparatus for carrying out the invention, but it is understood that the invention is not limited to the particular form of apparatus shown.

Fig. 1 shows a vertical section of the entire apparatus, and

Fig. 2 gives an illustration of one form of the extrusion nozzle.

Referring to Fig. 1 of the drawing a series of superposed troughs are shown enclosed in a housing or chamber. Outside the upper right hand corner of the housing is a supply tank to which is attached air injection means for forcing the rubber dispersion from the tank through the delivery pipe and nozzle which are shown at the extreme right of the topmost trough labeled "acetic acid bath". Directly beneath the topmost trough are three superposed troughs which contain glycerol at varying temperatures. Below the lowermost of the glycerol troughs is a water bath and beneath this a drying conveyor. Directly below the drying conveyor is placed a series of two troughs containing cold vulcanizing solution and at the end of the lowermost of these vulcanizing troughs is an alcohol bath. Below the alcohol bath are shown three drying conveyors, and directly beneath the last of the drying conveyors are two glycerol baths. At the extreme bottom of the apparatus are a water bath and drying conveyor.

Fig. 2 shows one form of nozzle with the tube issuing therefrom, and partly cut away to show the inner core of coagulating material. The coagulating material is supplied through a nozzle which is concentrically located within the latex extruding nozzle.

In carrying out the invention, latex or other rubber dispersion which may or may not contain compounding ingredients and/or vulcanizing ingredients is fed at a predetermined approximately constant rate through the nozzle situated at the right hand end of the uppermost trough, the acetic acid bath, and at the same time a stream of acetic acid is supplied to the nozzle located concentrically in the latex nozzle. When the extruded latex strikes the acetic acid bath it coagulates on the outside as well as on the inside, thus producing a tubular structure of coagulated rubber, and the formation of the tubular structure is continuous as long as the supply of rubber dispersion is maintained. In the accompanying drawing the tubing is represented as being carried through the acetic acid bath, over rollers down into the glycerol baths situated below through these and into the water bath, and thence to a drying conveyor. From the drying conveyor the tubing then passes through a vulcanizing solution and an alcohol bath to a second set of drying conveyors which deliver the tubing into hot glycerol where vulcanization takes place. From the hot glycerol troughs the tubing passes through a water bath to wash off the glycerol and thence to a drying conveyor and out of the apparatus as finished vulcanized tubing in a continuous length.

By properly controlling the peripheral speed of the rollers and drying conveyors the passage of the tubing through the various troughs and over the several conveyors can be continued at exactly the same rate as the latex or dispersion is delivered into the coagulating bath.

Various modifications of the apparatus may be employed. For example instead of arranging the various troughs in superposed relationship, they may be placed on the same level and in the same line. Depending upon the nature of the rubber dispersion and the way in which the extruded tubing is to be handled, parts of the operation of drying and vulcanizing may be varied or eliminated. The tubing, for example, may be taken directly from the acetic acid bath into a drying chamber and dried in a current of air, additional air being supplied, say under slight pressure, within the tube in order to prevent collapse. Or the tube may be drawn over a pole if desired and dried and afterwards vulcanized in the usual way. The process need not be made continuous, say in the manufacture of inner tubes, for it is within the scope of the invention to cut off suitable lengths after the extruded tube has been thoroughly coagulated, and further handle these tubes in any desired manner. In all instances, however, it is preferable to have the compounding ingredients and at least a portion of the vulcanized ingredients in the rubber dispersion or rubber latex prior to extrusion. The extruded nozzles may be arranged in series in order to form a number of tubes at the same time, the troughs in this case being wide enough to accommodate the desired number of tubes without contact between the several tubes. The shape of the orifice of the extrusion nozzle may of course be changed as desired to form tubular articles of various cross-sectional contour, such as oval, hexagonal, or irregular ovoid shapes, etc.

The rate of withdrawal of the material from the nozzle is important. If it is too slow the material tends to come out in kinks or even in poorly shaped coils. As the rate is increased the tube comes out perfectly straight and smooth. An excessive increase in the rate will tend to decrease the diameter of the tube by drawing it out. Such a decrease in diameter may be profitably employed in some cases where for example it is desired to make tubing of varying diameter from the same sized orifice.

At the beginning of the operation the flow of the rubber dispersion and the acetic acid stream through the concentric nozzle is started at approximately the same time, although it will be found advantageous to have the concentric stream of coagulant, that is the core of coagulant running before the latex is started in order to prevent the latex from entering into the concentric coagulant nozzle. The tubing is thus started before the nozzle is submersed in the bath of coagulant. Immediately the issuing stream makes contact with the bath of coagulant, the coagulum starts to form. It will be advantageous at the start to grasp the first issuing clot with a clip or other device and to lead it along through the bath until the process is well started and the tube has become long enough to pass over the first roller. Obviously at the start of the operation it is necessary to lead the tube from one roller to the next, but after the length of tubing is such that it has passed over all of the rollers and through all of the troughs, the process then becomes automatic and requires practically no more attention, provided the peripheral speed of the rollers has been properly adjusted.

The function of the coagulant core is to harden or coagulate the latex or dispersion from the inside towards the outside while the external coagulating bath provided at the point of extrusion exercises a reverse function of coagulating the rubber dispersion or latex from the outside towards the inside. The result of this simultaneous double coagulation taking place in opposite directions is to form a tubular structure of coagulated rubber, which can be carried along through the apparatus without collapse. Of course in the larger diameters of tubing, such as inner tubes, care must be taken at the ends of the various troughs to prevent the formation of a sharp kink. This is most easily remedied by placing the troughs in the same line and in the same horizontal plane.

The tubing passes from the acetic acid bath, in the apparatus shown, into cold glycerol, shown in the drawing at the extreme left of the first trough below the acetic acid bath. This passage through cold glycerol is to combine the glycerol with any acetic acid and water which still remain on the surface of the tube, rather than to have this combination take place in the hot glycerol where sputtering would occur. From the cold glycerol the tubing is drawn into the glycerol heated to 100–120° C. where some of the moisture is removed as well as part of the acetic acid which still clings to the surface. The glycerol is heated above the boiling point of water and acetic acid. Final traces of acetic acid may be removed by passing the tubing through glycerol heated to higher temperatures, say 125–145° C. In the larger sizes of tubing of course the expansion of the acetic acid core must be taken into account during passage through the glycerol bath. It will be found preferable to accomplish the surface drying at the maximum temperature permissible without undue expansion of the acetic acid within the tube. The invention may be carried out by using within the tube a different coagulating material which is not vaporized or is not vaporized to any extent by the hot glycerol bath. After passing through the glycerol the tubing passes through a water bath where the adhering glycerol is removed. From there the tubing is taken out on a drying conveyor to remove the water and is delivered into a trough containing vulcanizing solution. The vulcanizing solution may consist of 5 parts by weight of zinc butyl xanthogenate, 5 parts by weight of benzylamine, and 2 parts by weight of sulphur dissolved in 100 parts by weight of benzol containing 20–30% of carbon tetrachloride to increase the specific gravity of the benzol and to decrease its inflammability. Instead of the above vulcanizing solution, 3 parts by weight of nitrogen sulphide may be used alone, dissolved in 65 parts by weight of benzol and 35 parts by weight of carbon tetrachloride. Another vulcanizing solution is tetramethyl thiuramdisulphide 1 part, sulphur 3 parts, zinc oxide 2 parts, and diethylamine 2 parts dissolved in benzol 100 parts. (All amounts are in parts by weight.) Other vulcanizing solutions may be employed, if desired. From the foregoing vulcanizing solution the tubing passes through an alcohol bath which tends to harden the tubing which has become impregnated with the vulcanizing solution. Then the tubing is dried upon a series of conveyors and introduced into a hot glycerol bath where sufficient vulcanization is given so that the article may be removed and stored after another washing and drying operation.

Where vulcanizing ingredients are mixed with the latex, the following mixture may be employed: 100 parts of rubber as concentrated latex (55% solid content), 1 part tetramethylthiuram-disulphide, 2 parts zinc oxide, 3 parts precipitated sulphur.

Other latex compositions or compounded rubber dispersions may be employed instead of the above, without departing from the spirit of the invention, and the claims are to be so interpreted. For example vulcanization of the tubing may be accomplished entirely by penetration of the proper vulcanizing ingredients after the tubing has been dried. Or part of the vulcanizing combination may be incorporated with the latex at the start, and the remainder may be introduced by diffusion after the tubing has dried. What is known as vulcanized latex may be employed with equal facility, in which case it is merely necessary to dry the tube after coagulation.

As stated above the operation may be continuous through to the point of complete dehydration and vulcanization, or lengths of the tubing may be cut off and handled as lengths, particularly in the manufacture of inner tubes. The tube may be pinched off at the end of the coagulating bath and removed from the apparatus, opened to drain out the core of coagulant and further handled as may be desired.

Instead of acetic acid, various concentrations of alcohol may be employed as a coagulant. Zinc acetate may be added to the acetic acid to obviate the necessity of adding zinc in combination elsewhere in the process. Other drying agents than glycerol may be employed and other modifications of the process may be made without departing from the spirit of the invention which consists in forming a tubular structure directly from latex compounded or not compounded.

Having thus described our invention, what we claim and desire to protect by Letters Patent is:

1. A process for making tubing which comprises passing a stream of rubber latex through an opening adapted to form a tube, forming a tube from the rubber latex, and supporting the walls of the tube by a liquid core.

2. A process for making tubing which comprises passing a stream of rubber latex through an opening adapted to form a tube, coagulating the latex to form a tube, supporting the walls interiorly by a liquid coagulant, and drying the tube.

3. A process for manufacturing tubing which consists in flowing latex in a stream, coagulating said stream of latex from the inside outwardly to form a solid walled tube with walls of solid rubber derived directly from said latex, and producing a tube containing a coagulant in its bore, and removing the coagulant from within said tube.

4. A process for manufacturing tubing which consists in flowing latex in a stream, coagulating said stream of latex from the inside outwardly and from the outside inwardly to form a solid walled tube with walls of solid rubber derived directly from said latex, and producing a tube containing a coagulant in its bore, and removing the coagulant from within said tube.

5. A process for making tubing which consists in extruding a stream of rubber latex around a core of coagulating material into a coagulating bath, forming a solid walled tubular structure continuously with the stream, removing said core of coagulating material, and drying said tubular mass and recovering a tubular solid-walled length of rubber.

6. A process for making tubing which consists in extruding a stream of rubber latex around a core of coagulating material into a coagulating bath, forming a solid walled tubular structure continuously with the stream, removing said core of coagulating material, and drying and vulcanizing said tubular mass and recovering a tubular solid-walled length of rubber.

7. As a new article rubber tubing comprising latex extruded in the form of a tube, coagulated and dried.

8. As a new article rubber tubing comprising latex extruded in the form of a tube, coagulated, dried and vulcanized.

Signed at New York, New York, this 19th day of May, 1925.

ERNEST HOPKINSON.

Signed at New York, New York, this 20th day of May, 1925.

WILLIS A. GIBBONS.